United States Patent
Firman

(10) Patent No.: US 6,179,062 B1
(45) Date of Patent: Jan. 30, 2001

(54) GARDEN TOOL

(76) Inventor: Wesley W. Firman, Box 223, Tyndall, Manitoba (CA), R0E 2B0

( * ) Notice: Under 35 U.S.C. 154(b), the term of this patent shall be extended for 0 days.

(21) Appl. No.: 09/465,552

(22) Filed: Dec. 16, 1999

(51) Int. Cl.⁷ ........................................................ A01B 1/00
(52) U.S. Cl. ............................................................. 172/376
(58) Field of Search ............................. 172/27, 371, 376; 30/116, 318; 132/324

(56) References Cited

U.S. PATENT DOCUMENTS

| | | | |
|---|---|---|---|
| 1,050,721 | * | 1/1913 | Dickson ................................ 172/376 |
| 2,056,007 | * | 9/1936 | Jaenichen ............................. 172/376 |
| 2,397,786 | * | 4/1946 | Gascoigne et al. ............... 172/376 X |
| 2,797,628 | * | 7/1957 | Schrag .................................. 172/376 |
| 3,827,504 | | 8/1974 | Zimmerman . |
| 3,838,510 | * | 10/1974 | Kelly ...................................... 30/318 |
| 4,135,581 | | 1/1979 | Beale . |
| 4,913,241 | | 4/1990 | Haukaas . |
| 5,327,977 | * | 7/1994 | Lukuashuk ........................... 172/376 |

* cited by examiner

Primary Examiner—Robert E. Pezzuto
(74) Attorney, Agent, or Firm—Adrian D. Battison

(57) ABSTRACT

A garden tool comprising a ground engaging portion for engaging the ground and up rooting a plant, a handle extending upwardly and forwards from the ground engaging portion such that a user can stand upwardly while using the tool. The ground engaging portion including at least two arms extending downwards and forwards being spaced apart and parallel for digging underneath a surface of the ground and a wire coupled to an end of a respective arm extending horizontally therefrom and is coupled to the arms such that the wire has a substantial amount of tension for engaging a root of the plant. The ground engaging portion has two outer arms and an inner arm, the outer arms are spaced outwardly from the ground engaging portion such that the inner arm is located in between and in front of the two outer arms, the arms extend downwardly and forwardly forming a substantially "C" shape and the wire is connected to each of the arms at a groove which is cut into the ends of the arms. The end of each arm is substantially shovel shaped. The wire is located within grooves at the end of each arm. A wire housing is located on a top portion of the ground engaging portion at the handle which has a shaft such that a spool can be arranged to rotate about, the spool holds an extra amount of wire such that when the wire at the end of each arm is worn a replacement section of wire can be located at the end of each arm. A tensioning mechanism is connected to each arm, a threaded shaft extends coaxial from a respective arm in which a turnbuckle is fastened such that the turnbuckle can be rotated in a first direction thereby forcing the arms outward and the turnbuckle can be rotated in a second direction thereby forcing the arms inward, the outward force on the arms creates the tension on the wire and the inward force on the arms loosens the tension.

13 Claims, 3 Drawing Sheets

GARDEN TOOL

FIELD OF THE INVENTION

The present invention relates to a garden tool, more specifically the present invention is arranged to cut the roots of weeds and the like.

BACKGROUND

Generally, tilling or weeding gardens is done by using a conventional garden hoe which has a shovel that faces downwardly and has a front edge on the shovel which is arranged to dig into the ground. The conventional hoe is used by chopping into the ground which then forces the soil up turning the soil which therefore pulls out weeds. This chopping action of a conventional hoe pulls up large amounts of soil and is a fairly physically demanding process.

Some examples of farming equipment which is arranged to weed soil is shown is U.S. Pat. No. 4,135,581 (Beale), U.S. Pat. No. 4,913,241 (Haukaas) and U.S. Pat. No. 3,827,504 (Zimmerman). These farming tools are utilised by farmers who are tilling or weeding a lot of acreage and used these tools behind a tractor. These tools are not designed to be used in small gardens, similar to one s found at an individuals home or the like. The above U.S. Patents use a rod which is located at the end of a shank or the like and wherein the rod is located parallel to the ground such that the rod is pulled horizontally against the direction of travel. The rods pull through the ground cutting weeds and tilling the soil.

SUMMARY

The present invention is used as a weeding device and can also be used for thinning vegetables. When the tool is drawn along with some down pressure applied, the shanks penetrate the ground and the wire is pulled along beneath the surface, shearing off the weeds or vegetables. This tool requires less effort than a garden hoe as no chopping action is required and a minimum amount of soil is moved.

The present invention can be used as a tillage tool to pull weeds along vegetable row both before and after weeds have emerged. This tool is faster to use than a garden hoe and digs out weeds more efficiently. Soil disturbance is minimal.

According to the present invention there is provided a garden tool comprising;

a ground engaging portion for engaging the ground and up rooting a plant;

a handle extending upwardly and forwards from the ground engaging portion such that a user can stand upwardly while using the tool;

the ground engaging portion including at least two arms extending downwards and forwards being spaced apart and parallel for digging underneath a surface of the ground;

and a wire coupled to an end of a respective arm extending horizontally therefrom and is coupled to the arms such that the wire has a substantial amount of tension for engaging a root of the plant.

Preferably the ground engaging portion has two outer arms and an inner arm, the outer arms are spaced outwardly from the ground engaging portion such that the inner arm is located in between and in front of the two outer arms, the arms extend downwardly and forwardly forming a substantially "C" shape and the wire is connected to each of the arms at a groove which is cut into the ends of the arms.

Preferably the end of each arm is substantially shovel shaped.

Preferably the wire is located within grooves at the end of each arm.

Preferably a wire housing is located on a top portion of the ground engaging portion at the handle which has a shaft such that a spool can be arranged to rotate about, the spool holds an extra amount of wire such that when the wire at the end of each arm is worn a replacement section of wire can be located at the end of each arm.

Preferably a tensioning mechanism is connected to each arm, a threaded shaft extends coaxial from a respective arm in which a turnbuckle is fastened such that the turnbuckle can be rotated in a first direction thereby forcing the arms outward and the turnbuckle can be rotated in a second direction thereby forcing the arms inward, the outward force on the arms creates the tension on the wire and the inward force on the arms loosens the tension.

BRIEF DESCRIPTION OF THE DRAWINGS

In the accompanying drawings, which illustrate an exemplary embodiment of the present invention.

DETAILED DESCRIPTION

Figure 1:
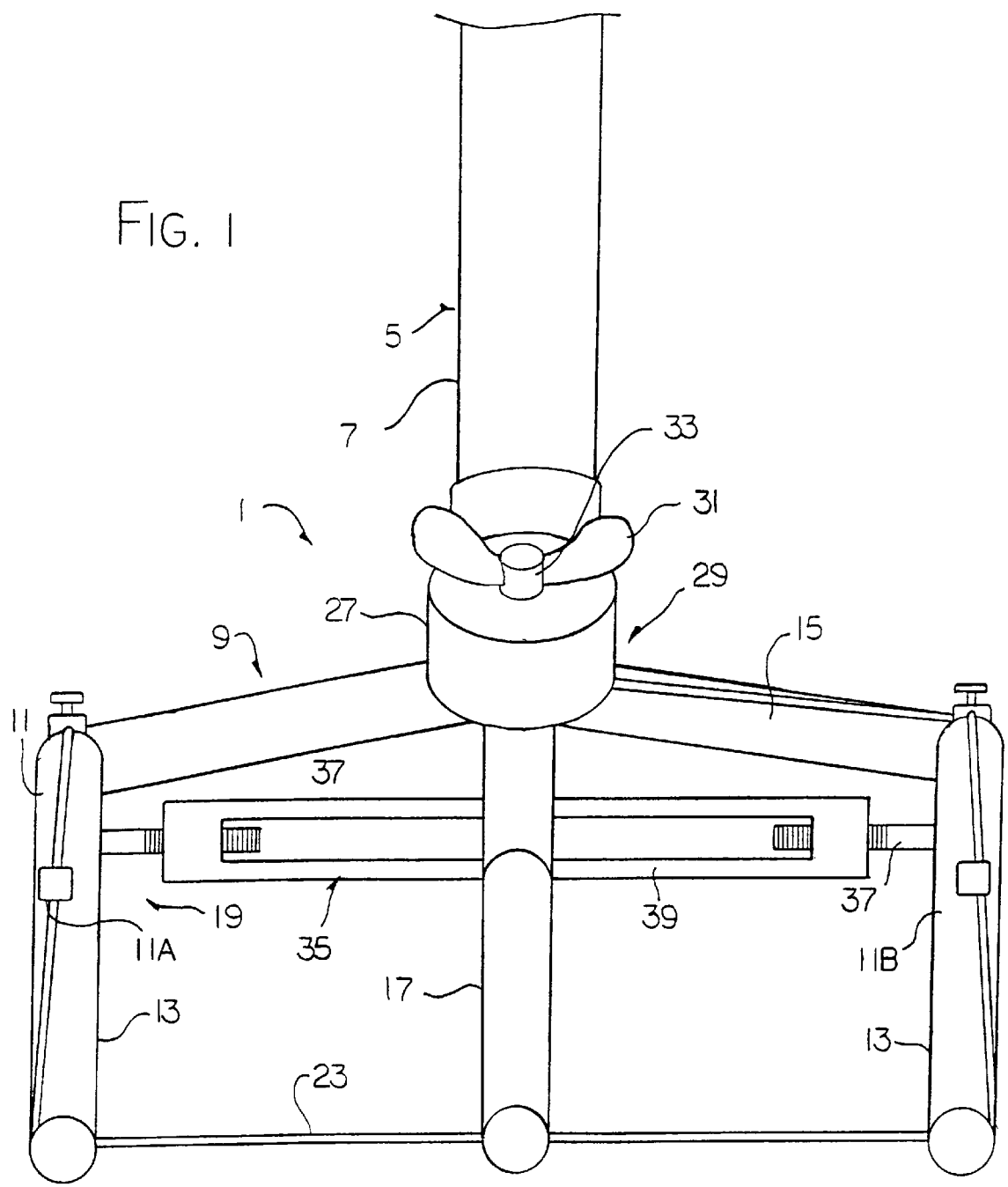
FIG. 1 is a rear elevational view of the present invention.
Figure 2:
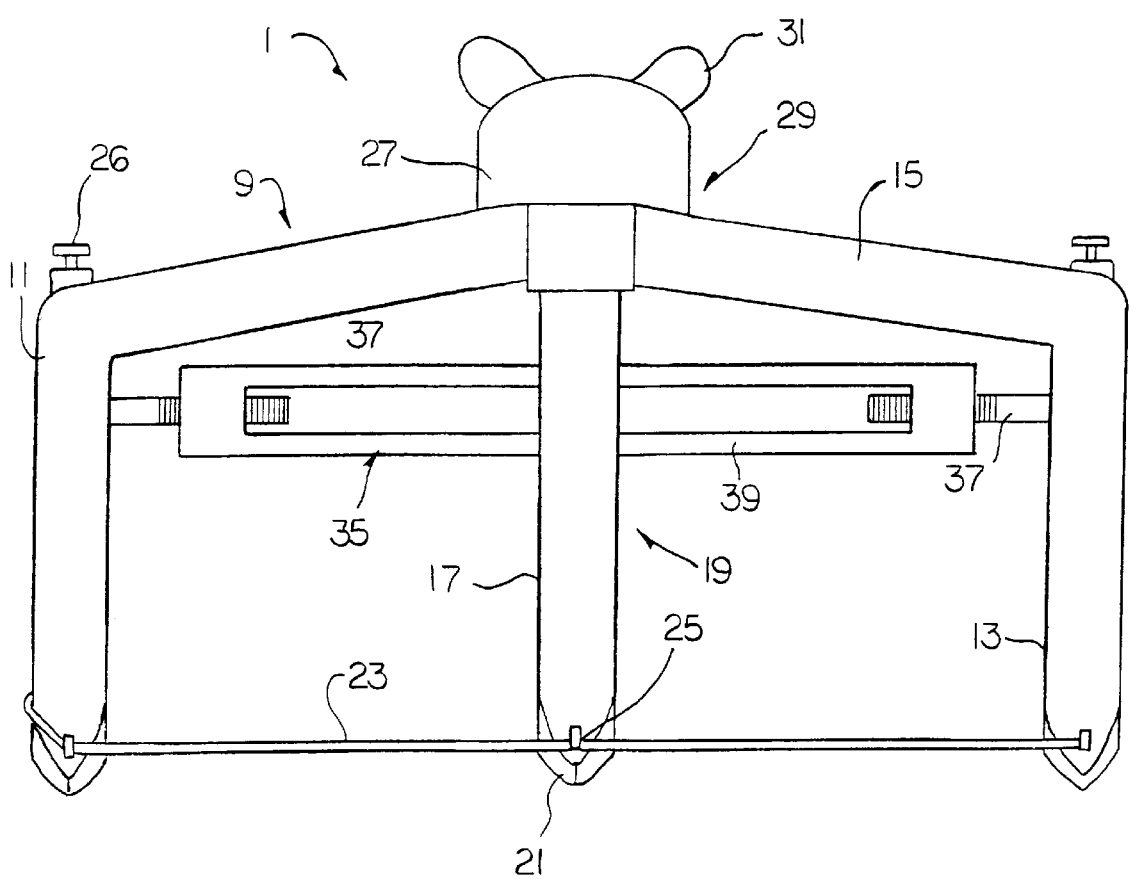
FIG. 2 is a front elevational view of the present invention.
Figure 3:
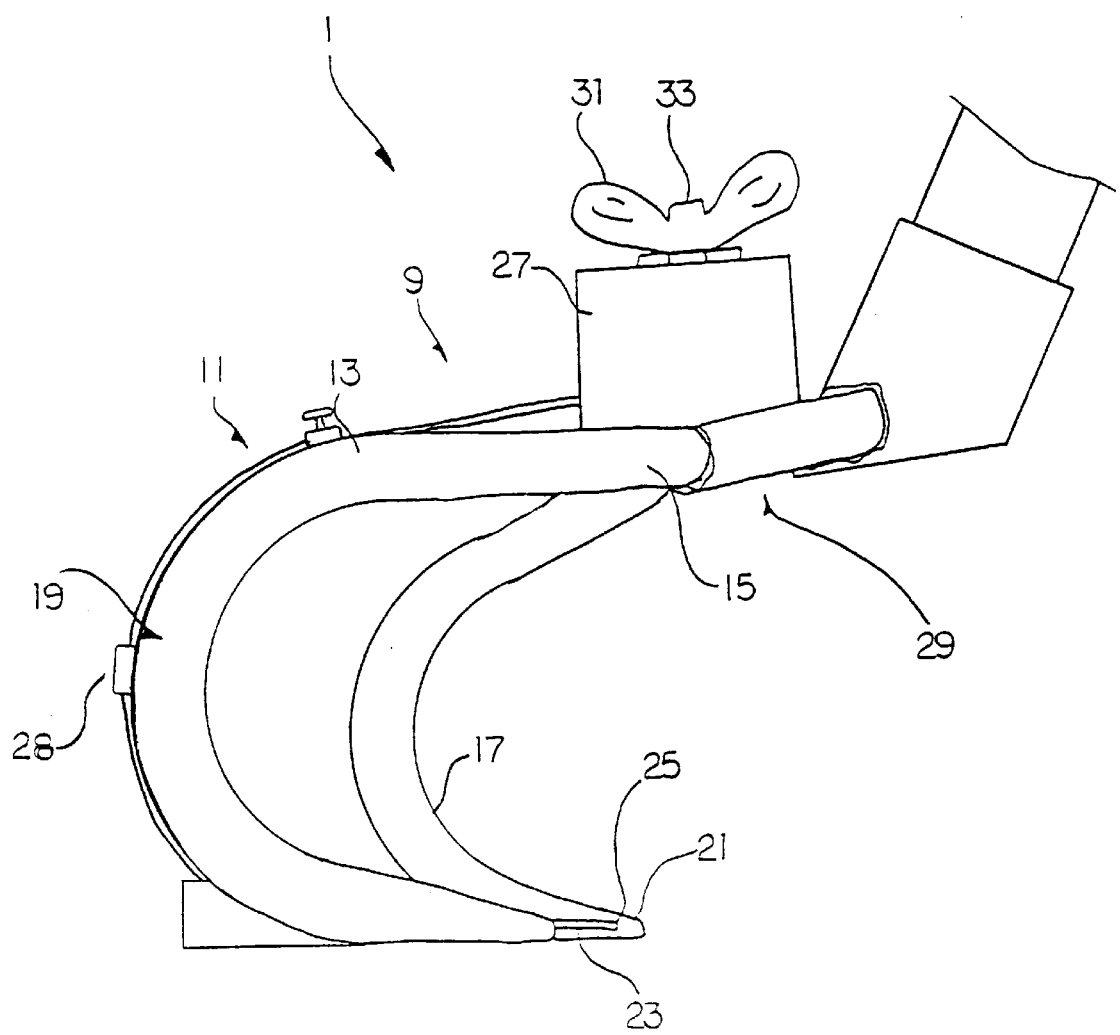
FIG. 3 is a side elevational view of the present invention.

Referring to the accompanying drawings, there is illustrated a garden tool 1 which is used for cultivating soil 3 in a garden. The tool is arranged to move the weeds from the garden by digging into the soil and cutting the roots of the weeds so that the weeds can be pulled out of the soil by the tool. The tool has a handle 5 which extends upwardly so that a user can stand upright while using the tool. The handle is an elongate wooden shaft 7 which is coupled to a ground engaging portion 9 which is arranged to engage the ground or the soil for uprooting the weeds and cultivating the soil. The handle can also be arranged such that the tool is used by a person who is one their knees or the like.

The ground engaging portion has a plurality of arms 11 which extend downwardly and forwardly for digging into the soil. A first pair of arms 13 are spaced equidistantly apart from the shaft and are attached to an outermost end of a pair of support arms 15 which extend outwardly to a respective side of a shaft. A center arm 17 extends downwardly from the bottom end of the shaft and extends downwardly and forwardly such that a bottom end of each arm is arranged to engage the ground at the same time. The center arm is located directly between and is located slightly forward each of the outside arms. Each of the arms have a forwardly curved portion 19 which extend forwardly, substantially "C" shaped, such that an end 21, defining a blade or shovel, of each arm is designed to dig into the ground for cultivating the soil. A wire 23 is coupled to each end of each arm, the rod being a suitable elongate material which can sustain a suitable amount of tension. The wire is feed though a set screw 26 which is located on the top of each outer arm such that the wire is tightened in position by the set screw on the first arm and is supported at the end of the wire at the second arm by the set screw. The wire extends downwardly along the rear side of the arms such that the wire from the set screw to the end of the arm does not engage the ground. The wire is held behind the arms by a sleeve 28. The wire is coupled to each end of the arm by a wire mount 25 which is positioned such that the wire extends horizontally at a right angle relative to the arms which allows the wire to cut the root of the weed so that the root can be uprooted from the soil. The wire mount is a groove which is cut into the ends of the arms and is fastened to one of the two outside arms 11A is wraps around a respective outside arm 11B. The wire is dispensed from a spool housing 27 which is located at a top portion 29 of the ground engaging portion which contains a spool of wire such that when the wire is worn by cutting through the roots and soil the wire can then be pulled out of the spool and the worn wire can be replaced by a second strip of wire. The spool has a wing nut 31 which is tightened onto a shaft 33 in which the spool of wire is arranged to rotate about. The wing nut is arranged to tighten the housing onto the spool so that the spool does not become loose and lose the tension of the wire extending from each end of the arm. The wire is used because as the wire begins to become worn the effectiveness of the wire is increased due to the thinning of the wire making the wire sharper which cuts the roots of the weeds more easily, as well the thinner wire creates less resistance to the tool going through the ground.

A tensioning mechanism 35, or turnbuckle, is attached to each of the outer arms and extends horizontally parallel to the wire and is arranged to force the outer arms outwardly or to pull the outer arms inwardly such that the wire, located in the grooves, can be tensioned by forcing the arms outwardly and the wire can be loosened by forcing the arms inwardly. The tensioning mechanism has a threaded shaft 37 which extends inwardly at a right angle from each of the outer arms and a rotating mechanism 39 is threaded onto each shaft such that the rotating mechanism can be rotated so that the arms are forced outwardly and can be rotated a second direction so that the arms can be pulled inwardly.

The present invention is a hand held garden tool consisting of 3 shanks, arms, arranged in a "V" pattern, with a wire stretched across the bottom of the shanks. The wire is secured to the bottom of the shanks is held in placed in grooves cut in the shanks and tightened by means of a turnbuckle. The wire used can be mig welding wire. This tool is secured to a pole type handle and is drawn along the ground similar to a conventional garden hoe.

In operation, a user will force the ends of the arms into the soil and will pull the ground engaging portion forwardly so that the arms are moved through the soil and so that the wire can cut the roots of the weeds for cultivating the soil. The arms are arranged such that pulling the ground engaging portion through the soil uses a small amount of force by the user in that it does not pull large amounts of soil as found by a standard hoe or the like. The wire allows the ground engaging portion to have a cutting action as would a hoe but without again the large amounts of soil needed to be pulled in order to cultivate the soil.

While one embodiment of the present invention has been described in the foregoing, it is to be understood that other embodiments are possible within the scope of the invention. The invention is to be considered limited solely by the scope of the appended claims.

What is claimed is:

1. A garden tool comprising;
    a ground engaging portion for engaging the ground and up rooting a plant;
    a handle extending upwardly and forwards from the ground engaging portion;
    the ground engaging portion including three arms extending downwards and forwards to a forwardmost tip and being spaced apart and parallel for digging underneath a surface of the ground;
    and a wire coupled to an end of a respective arm extending horizontally therefrom and is coupled to the arms such that the wire is tensioned for engaging a root of the plant;
    wherein the ground engaging portion has two outer arms and an inner arm, the outer arms are spaced outwardly to respective sides of the ground engaging portion such that the inner arm is located in between the two outer arms;
    the arms being arranged such that the forwardmost tip of the inner arm is in advance of the forwardmost tip of the outer arm.

2. The garden tool according to claim 1 wherein the arms extend downwardly and forwardly forming a substantially "C" shape and the wire is connected to each of the arms at a groove which is cut into the ends of the arms.

3. The garden tool according to claim 1 wherein the end of each arm is substantially shovel shaped.

4. The garden tool according to claim 1 wherein the wire is located within grooves at the end of each arm.

5. The garden tool according to claim 1 wherein a wire housing is located on a top portion of the ground engaging portion at the handle which has a shaft such that a spool can be arranged to rotate about, the spool holds an extra amount of wire such that when the wire at the end of each arm is worn a replacement section of wire can be located at the end of each arm.

6. The garden tool according to claim 1 wherein a tensioning mechanism is connected to each arm, a threaded shaft extends coaxial from a respective arm in which a turnbuckle is fastened such that the turnbuckle can be rotated in a first direction thereby forcing the arms outward and the turnbuckle can be rotated in a second direction thereby forcing the arms inward, the outward force on the arms creates the tension on the wire and the inward force on the arms loosens the tension.

7. The garden tool according to claim 6 wherein a set screw is located on each outer arm such that the wire is feed through the set screw so that the set screw can tighten onto the wire for holding the wire in place while being tensioned by the tensioning device.

8. A garden tool comprising;
    a ground engaging portion for engaging the ground and up rooting a plant;
    a handle extending upwardly and forwards from the ground engaging portion;
    the ground engaging portion including at least two arms extending downwards and forwards to a forwardmost end and being spaced apart and parallel for digging underneath a surface of the ground;
    and a wire coupled to an end of a respective arm extending horizontally therefrom and is coupled to the arms such that the wire is tensioned for engaging a root of the plant;
    wherein the arms extend downwardly and forwardly forming a substantially "C" shape and the wire is connected the end of each arm;
    wherein the forwardmost end of each arm extends ahead of the wire with the forwardmost end being shaped such the end defines a blade for cutting through the soil.

9. The garden tool according to claim 8 wherein the ground engaging portion has two outer arms and an inner arm, the outer arms are spaced outwardly from the ground engaging portion such that the inner arm is located in between and in front of the two outer arms and the wire is connected to each of the arms at a groove which is cut into the ends of the arms.

10. The garden tool according to claim 8 wherein the wire is located within grooves at the end of each arm.

11. The garden tool according to claim 8 wherein a wire housing is located on a top portion of the ground engaging portion at the handle which has a shaft such that a spool can be arranged to rotate about, the spool holds an extra amount of wire such that when the wire at the end of each arm is worn a replacement section of wire can be located at the end of each arm.

12. The garden tool according to claim 8 wherein a tensioning mechanism is connected to each arm, a threaded shaft extends coaxial from a respective arm in which a turnbuckle is fastened such that the turnbuckle can be rotated in a first direction thereby forcing the arms outward and the turnbuckle can be rotated in a second direction thereby forcing the arms inward, the outward force on the arms creates the tension on the wire and the inward force on the arms loosens the tension.

13. The garden tool according to claim 12 wherein a set screw is located on each outer arm such that the wire is feed through the set screw so that the set screw can tighten onto the wire for holding the wire in place while being tensioned by the tensioning device.

* * * * *